US007684027B2

(12) United States Patent
Douglas et al.

(10) Patent No.: US 7,684,027 B2
(45) Date of Patent: Mar. 23, 2010

(54) METHODS AND SYSTEMS FOR WHEEL BALANCER WEIGHT PLACEMENT AID

(75) Inventors: Michael W. Douglas, St. Charles, MO (US); Michael D. Gerdes, St. Peters, MO (US); David M. Scribner, St. Charles, MO (US); Micah N. Vaninger, St. Louis, MO (US)

(73) Assignee: Hunter Engineering Company, St. Louis, MO (US)

( * ) Notice: Subject to any disclaimer, the term of this patent is extended or adjusted under 35 U.S.C. 154(b) by 502 days.

(21) Appl. No.: 11/614,723

(22) Filed: Dec. 21, 2006

(65) Prior Publication Data

US 2008/0150348 A1  Jun. 26, 2008

(51) Int. Cl.
*G01B 11/26* (2006.01)
*B60B 1/00* (2006.01)
*B60B 27/00* (2006.01)

(52) U.S. Cl. .................................. 356/155; 301/5.21
(58) Field of Classification Search .............. 73/66, 73/455–487; 301/5.1–5.22; 356/138–155
See application file for complete search history.

(56) References Cited

U.S. PATENT DOCUMENTS

| 3,741,017 | A * | 6/1973 | Reiser ........................ 73/480 |
| 6,244,108 | B1 * | 6/2001 | McInnes et al. .............. 73/462 |
| 6,397,675 | B1 * | 6/2002 | Colarelli et al. .............. 73/462 |
| 6,484,574 | B1 | 11/2002 | Douglas et al. |
| 6,535,281 | B2 | 3/2003 | Conheady et al. |
| 6,952,964 | B2 * | 10/2005 | Gerdes et al. ................ 73/462 |
| 6,983,656 | B2 * | 1/2006 | Cullum et al. ............... 73/487 |
| 7,191,651 | B2 * | 3/2007 | Douglas et al. .............. 73/462 |
| 2003/0074151 | A1 * | 4/2003 | Rapp ........................ 702/105 |
| 2004/0051864 | A1 | 3/2004 | Braghiroli |
| 2005/0052657 | A1 | 3/2005 | Braghiroli |
| 2005/0052658 | A1 * | 3/2005 | Braghiroli .................. 356/602 |
| 2005/0055153 | A1 | 3/2005 | Braghiroli |
| 2005/0274179 | A1 | 12/2005 | Douglas |
| 2006/0042380 | A1 | 3/2006 | Douglas et al. |

FOREIGN PATENT DOCUMENTS

| DE | 4325533 C2 | | 1/1998 |
| EP | 0565320 A2 | | 10/1993 |
| FR | 2674331 | | 9/1992 |
| GB | 1380479 | * | 1/1975 |
| JP | 56157829 A2 | | 12/1981 |

OTHER PUBLICATIONS

Coats 1250 Wheel Balancer Instruction Manual, Hennessy Industries, Inc., Jun. 2006.
Coats Model 1250 Wheel Balancer Specification Sheet, Hennessy Industries, Inc., Nov. 2005.
C40 Professional Flyer, CEMB, 1996.
Letter from Stephen A. Becker of McDermott Will & Emery dated Feb. 24, 2009.

* cited by examiner

*Primary Examiner*—Gregory J Toatley, Jr.
*Assistant Examiner*—Jarreas C Underwood
(74) *Attorney, Agent, or Firm*—Armstrong Teasdale LLP (57) ABSTRACT

Methods and systems for facilitating weight placement on a vehicle wheel assembly that includes a tire and a wheel are provided. The method includes determining an imbalance characteristic associated with a plane of the vehicle wheel, determining a correction weight placement position associated with the determined imbalance characteristic, and directing a line of visible light at the determined weight placement position.

19 Claims, 5 Drawing Sheets

METHODS AND SYSTEMS FOR WHEEL BALANCER WEIGHT PLACEMENT AID

BACKGROUND OF THE INVENTION

This invention relates generally to balancing vehicle wheels and more particularly, to methods and systems for balancing vehicle wheels using a balancer that includes a balance weight placement aid.

At least some known automotive wheel balancer manufacturers offer a feature which illuminates a portion of the wheel assembly to indicate a location for the application of balance correction weights. U.S. Pat. No. 6,244,108 to McInnes, et al. describes a wheel balancer for balancing a wheel. A telescoping extendible sensor arm physically detects adhesive balance weight receiving locations on a rim of the wheel at desired balancing planes. The adhesive balance weight receiving locations are indicated by a laser light source which directs a laser dot at the rim to thereby indicate to an operator the precise position at which the correcting balance weight is to be attached to the rim.

U.S. Pat. No. 6,484,574 to Douglas et al. describes a wheel balancer including a rim measuring apparatus configured to scan the inner surface of the wheel rim/tire assembly. The optimum plane locations, amounts of correction weights, and the number of correction weights, are calculated by a control circuit to result in a minimized residual static and dynamic imbalance. The control circuit utilizes a motor drive to automatically index and hold the wheel at the proper rotational position for placement of an adhesive imbalance correction weight, and a laser pointer illuminates the surface of the rim at the axial position of the weight imbalance correction plane at which the imbalance correction weight is to be applied.

A Coats Model 1250 Wheel Balancer is described as Coats Model 1250 having a Laser Guided Operation™ for placing adhesive weights to an inner rim of a wheel. The balancer includes a laser dot that is positionally adjustable using a manual laser locator knob to a desired weight location. The balancer also includes a manually activated line laser that displays a line of laser light along an inner circumferential span representing the balance plane on an inner surface of the wheel rim near a bottom dead center position for locating the laser dot on the balance plane. The intersection of the dot and the line indicates the adhesive weight placement location. These totally-manual lasers must be positioned by the operator and are not controlled by the Coats Model 1250 Wheel Balancer.

But such adhesive weight placement aid systems do not address the modes of balancing which require clip style weights to be attached at the rim lip to tire interface. Clip weights are typically installed at "Top Dead Center" (TDC), which is straight up from the center of the wheel (12 o'clock position). But because the user cannot easily position himself to view these locations "straight on," it is very difficult to judge accurately where TDC physically is. The viewing angle of the operator to the wheel can result in TDC placement errors. Placement errors as small as can ¼ inch can cause significant residual static imbalance that is directly proportional to the weight size, yet placement errors as high as ¾ inch from TDC have been observed in actual usage in shops.

CEMB of Italy describes their model C40 Professional balancer in an advertising bulletin from approximately 1996. The C40 Professional projected a sheet of incandescent light onto the TDC tread portion of a tire mounted onto the balancer. The machine had no provisions for automatically holding the wheel at the balance position. The TDC tread of the wheel assembly was continuously illuminated and the bulletin does not describe turning on the light when the correction weight location was at TDC, or any control of the light by the wheel balancer. The illumination also did not provide indication to the operator which plane was being serviced since the line covered the entire top surface of the tire tread. Also, the sidewall bulge of most tires would prevent the light source from striking a line at the actual location of the clip weights on the wheel rim. The user in most cases would be observing a line on top of the tire when he really needs it on the sidewall where it intersects the rim, which could be several inches away. This could result in significant weight placement errors.

The weight placement error and residual static imbalance problem is even worse when using adhesive weights when the aforementioned adhesive weight placement aid systems do not exist on the wheel balancer (these systems can be expensive or considered to be cumbersome to operate). Adhesive weights are typically mounted at TDC or at BDC and either location is extremely difficult to judge. For TDC the user must work "upside down", contorting himself in the process. For BDC the balancer's mounting shaft is in the way of getting a straight down view at the weight location. A method of minimizing imbalance is needed for all instances of weight placement methods available without causing any residual static imbalance after placing the correction weights.

BRIEF DESCRIPTION OF THE INVENTION

In one embodiment, a method of facilitating weight placement on a vehicle wheel assembly includes determining an imbalance characteristic associated with a plane of the vehicle wheel, determining a correction weight placement position associated with the determined imbalance characteristic, and directing a line of visible light substantially at the determined weight placement position.

In another embodiment, a wheel balancer system includes a rotatable wheel assembly mount and a processor communicatively coupled to at least one imbalance sensor configured to measure an imbalance characteristic associated with the wheel assembly. The processor is configured to determine imbalance characteristics of the wheel assembly, determine a correction weight placement position associated with the determined imbalance characteristics, and direct a line of visible light across at least one of an interface between the tire and the wheel, the tire, and an inner circumferential periphery of the rim at the determined weight placement position when the wheel assembly is positioned substantially at a balance position.

In yet another embodiment, a wheel balancer system for measuring imbalance in a vehicle wheel assembly includes a rotatable wheel assembly mount, a subsystem coupled to said wheel assembly mount, said subsystem configured to rotate said wheel assembly, and a light source configured to direct a line of visible light toward at least one of an interface between the tire and the wheel, and an inner circumferential periphery of a rim of the wheel at a weight placement position when the wheel assembly is positioned substantially at a balance position.

DETAILED DESCRIPTION OF THE INVENTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
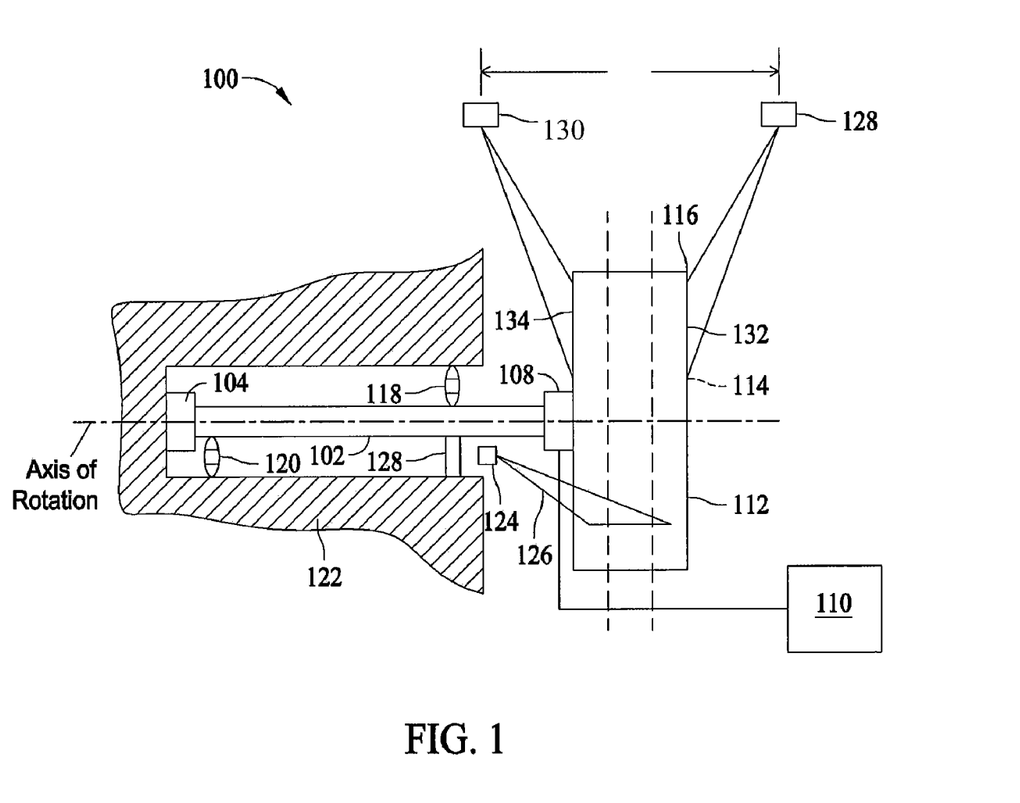
FIG. 1 is a perspective view of a vehicle wheel balancing system in accordance with an embodiment of the present invention.

FIG. 1 is a perspective view of a vehicle wheel balancing system 100 in accordance with an embodiment of the present invention. Vehicle wheel balancing system 100 as shown is illustrative only, as one of ordinary skill in the art in the balancer field will recognize that the particular devices and structures used to obtain dimensional and imbalance information related to a rotating body may be readily changed without changing the present invention.

Balancing system 100 includes a rotatable shaft or spindle 102 driven by a suitable drive mechanism such as a motor 104 directly coupled to shaft 102 as shown or coupled to shaft 102 through a power transmission device such as a drive belt (not shown). Mounted on shaft 102 is a position indictor such as a conventional optical shaft encoder 108 which provides speed and rotational position information to a central processing unit 110.

During the operation of wheel balancing, at the end of the shaft 102, a wheel assembly 112 under test is removably mounted for rotation. Wheel assembly 112 may comprise a wheel rim 114, or wheel rim 114 and a tire 116 mounted thereon. To determine the wheel assembly imbalance, balancer 100 includes at least one imbalance force sensor 118 and 120, such as a piezoelectric sensor or a strain gauge, coupled to shaft 102 and mounted on a balancing system base 122.

When wheel assembly 112 is unbalanced, it vibrates in a periodic manner as it is rotated, and these vibrations are transmitted to shaft 102. Imbalance sensors 118 and 120 are responsive to these vibrations in shaft 102, and generate a pair of electrical signals corresponding to the phase and magnitude of the vibrations at the particular sensor locations. These signals are input to central processing unit 110, which determines forces acting on the rotating body due to the imbalance and determines the required magnitudes and placement locations of correction weights necessary to correct the imbalance.

In the exemplary embodiment, a weight placement location for each weight required is illuminated by a line of light, for example, from a source of laser light. In the case of adhesive weights that are placed on and adhered to an inner surface of wheel rim 114, a first source of laser light 124 is mounted to illuminate an area of wheel rim 114 proximate the bottom dead center of wheel rim 114. Source 124 emits a beam 126 of laser light that is configured into a line by, for example, but not limited to, spreading the beam or oscillating a mirror within the beam or by oscillating the laser element itself. In the exemplary embodiment, source 124 is configured to emit the laser light only when the weight placement location is rotated into a position substantially coincident with where laser source 124 is aimed. In an embodiment, wheel assembly 112 is rotated into a balance position wherein the weight placement location is in alignment with predetermined rotational position. The predetermined rotational position is selectable based on ensuring the balance position is convenient for the user to install the weight at the weight placement location. In one embodiment, the predetermined rotational position is at bottom dead center. In another embodiment, the predetermined rotational position is displaced from bottom dead center by an amount that makes the weight placement location easier for the user to reach. Wheel assembly 112 may be rotated to the balance position manually at which point source 124 will energize to emit a line of laser light onto rim 114 at the weight placement location. If wheel assembly 112 rotates away from the balance position, source 124 will deenergize indicating that wheel assembly is no longer at the balance position. Source 124 will reenergize when wheel assembly 112 is rotated back to the balance position. In another embodiment, system 100 includes a positioning device 128, such as a servo that automatically positions wheel assembly 112 at the balance position. Encoder 108 determines the position of wheel assembly 112 with respect to the balance position and controls positioning device 128 to align the position of wheel assembly 112 with the balance position. In an alternative embodiment, motor 104 is used to perform the function of positioning device 128.

Balancing system 100 also includes a source of laser light configured to illuminate an area of wheel assembly 112 where clip-on style weights are installed. Such weights are generally applied to a lip of wheel rim 114 where tire 116 engages rim 114. In the exemplary embodiment, the source of laser light is embodied in a second source of laser light 128 and a third source of laser light 130. Second source 128 is configured to illuminate an outer clip-on weight placement area 132 of wheel assembly 112. Third source 130 is configured to illuminate an inner clip-on weight placement area 134 of wheel assembly 112. Inner and outer clip on weight placement areas 134 and 132 include the portion of wheel assembly 112 proximate an interface between rim 114 and tire 116. Sources 128 and 130 are displaced along the axis of rotation of wheel assembly 112 to permit sources 128 and 130 to illuminate the interface between rim 114 and tire 116. For example, using a single source of laser light above wheel assembly 112 would not permit the source to illuminate the interface because the bulging sidewall (not shown) of tire 116 would block the laser light from illuminating the weight placement location.

Figure 2:
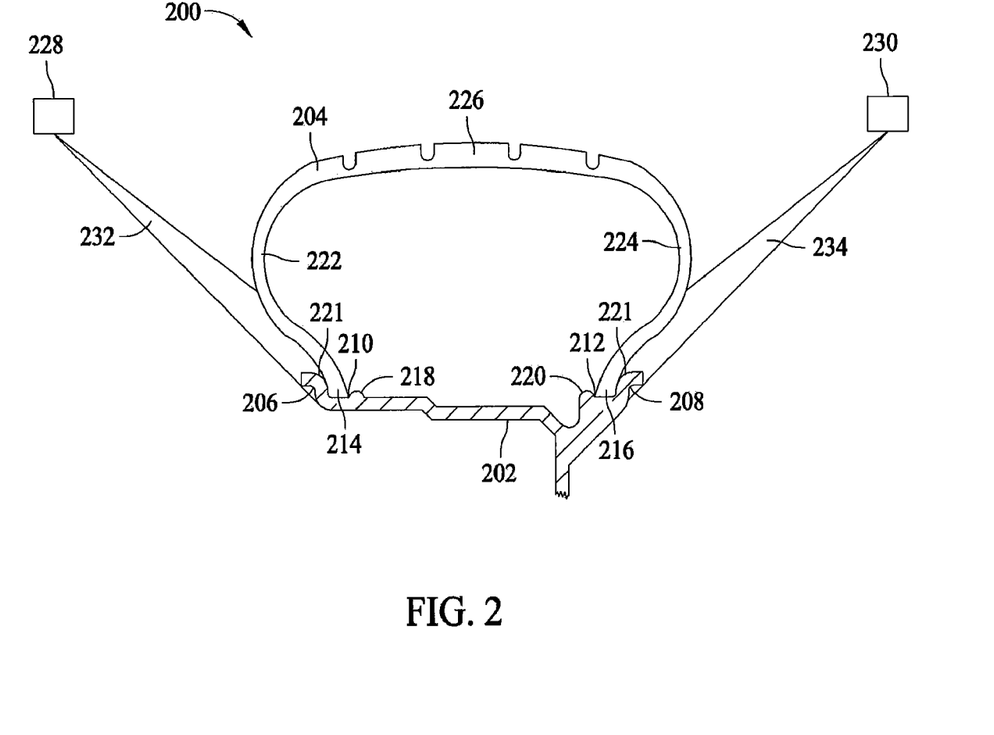
FIG. 2 is a cross-sectional view of a wheel assembly including a wheel rim and a tire such as may be used with vehicle wheel balancing system shown in FIG. 1.

FIG. 2 is a cross-sectional view of a wheel assembly 200 including a wheel rim 202 and a tire 204 such as may be used with vehicle wheel balancing system 100 (shown in FIG. 1). Wheel rim 202 includes an inboard flange 206 and an onboard flange 208 extending from a respective inboard bead seat 210 and an outboard bead seat 212. A complementary inboard bead 214 and outboard bead 216 of tire 204 engages wheel rim 202 at inboard bead seat 210 and outboard bead seat 212. Wheel rim 202 also includes an inboard safety hump 218 and an outboard safety hump 220 that facilitates mating of tire 204 to wheel rim 202 at an interface 221. Tire 204 includes inner and outer sidewalls 222, 224 extending between beads 214, 216 respectively, and a radially outer tread 226. Sidewalls 222, 224 tend to extend axially outwardly from flanges 206 and 208 due to air pressure internal to tire 204.

In the exemplary embodiment, balance weights are coupled to or clipped-onto inboard flange 206 and/or onboard flange 208 in a determined angular position and magnitude of weight. An accurate angular placement of the weight along inboard flange 206 and an onboard flange 208 facilitates reduced vibration in wheel assembly 200 during operation. During balancing, vehicle wheel balancing system 100, determines a proper placement location for the weight and when wheel assembly 200 is rotated into a balance position wherein the determined placement location is aligned with a predetermined angular position, a weight placement aid is energized to indicate the weight placement location accurately. The predetermined angular position is selectable by a user to facilitate the user applying the weight to flange 206 or 208 in a most convenient manner. Predetermined angular position may be selected based on ergonomic considerations, safety considerations, or simply by preference of the user. In the exemplary embodiment, the predetermined angular position is a top dead center position of wheel assembly 200. Accordingly, when the determined weight placement location is aligned with the top dead center position, wheel assembly 200 is considered to be in the balance position and the weight placement aid is energized to illuminate an area on wheel assembly 200 to install an imbalance correction weight.

In the exemplary embodiment, the weight placement aid includes a laser light source 228, 230 configured to generate a laser fan beam 232, 234 directed toward flange 206 and/or 208. Sources 228, 230 are positioned axially displaced from flanges 206 and 208 to permit fan beam 232, 234 to be in line of sight with flanges 206 and 208. In the exemplary embodiment, the intersection of fan beam 232, 234 and wheel assembly 200 forms a line of light on sidewall 222,224. In an alternative embodiment, the line of light extends radially to include interface 221 and/or flange 206, 208.

During clip style weight balancing procedures, laser light source 228 is energized when wheel assembly 200 is in the inboard balance position and laser light source 230 is energized when wheel assembly 200 is in the outboard balance position to provide the user with a visual cue as to where to place a weight.

Figure 3:
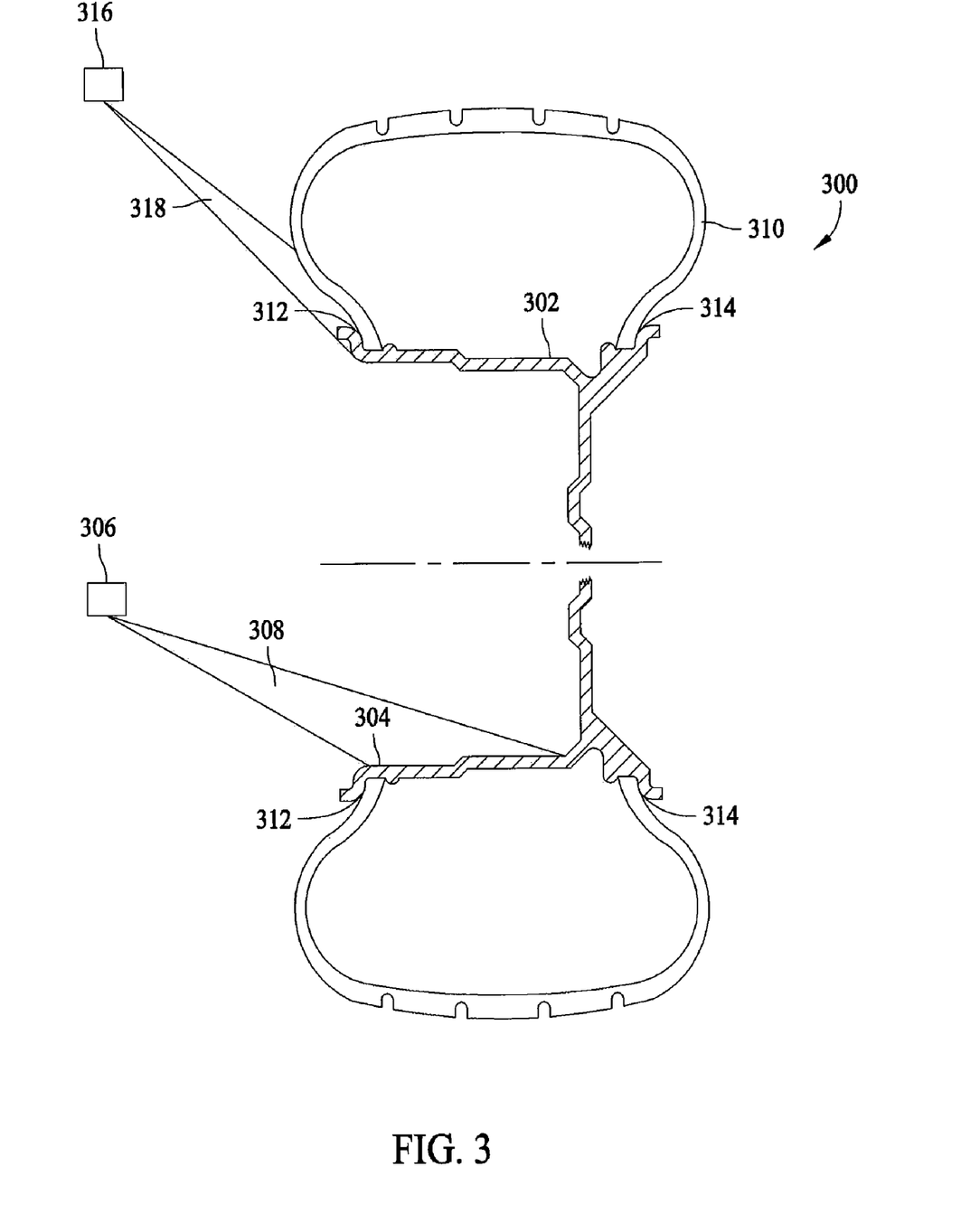
FIG. 3 is a cross-sectional view of a wheel assembly including a wheel rim such as may be used with vehicle wheel balancing system shown in FIG. 1.

FIG. 3 is a cross-sectional view of a wheel assembly 300 including a wheel rim 302 such as may be used with vehicle wheel balancing system 100 (shown in FIG. 1) during adhesive style weight balancing procedures. Wheel rim 302 includes an inner rim surface 304 extending circumferentially about an interior of wheel rim 302. Vehicle wheel balancing system 100 includes a laser light source 306 that is configured to emit a fan beam 308 of light towards inner rim surface 304. In the exemplary embodiment, fan beam 308 intersects inner rim surface 304 at a bottom dead center position. In an alternative embodiment, laser light source is configured to direct fan beam 308 towards a predetermined angular position. The predetermined angular position is selected based on for example, but not limited to convenience of the user, safety concerns, or to facilitate the user applying the balance weight to a determined weight placement position.

In the exemplary embodiment, balance weights are coupled to inner rim surface 304 in a determined angular position and magnitude of weight. An accurate placement of the weight along inner rim surface 304 facilitates reduced vibration in wheel assembly 300 during operation. During balancing, vehicle wheel balancing system 100, determines a proper placement location for the weight and when wheel assembly 300 is rotated into a balance position wherein the determined placement location is aligned with the predetermined angular position, a weight placement aid is energized to indicate the weight placement location accurately. The predetermined angular position is selectable by a user to facilitate the user applying the weight to inner rim surface 304 in a convenient manner. The predetermined angular position may be selected based on for example, but not limited to ergonomic considerations, safety considerations, or by preference of the user. In the exemplary embodiment, the predetermined angular position is a bottom dead center position of wheel assembly 300. Accordingly, when the determined weight placement location is aligned with the bottom dead center position, wheel assembly 300 is considered to be in the balance position and the weight placement aid is energized to illuminate an area on wheel assembly 300 to install an imbalance correction weight.

In various embodiments, wheel assembly 300 includes a tire 310 installed on wheel rim 302. An inner interface 312 and an outer interface are defined at the junction between where tire 310 contacts wheel rim 302. A source of laser light 316 is configured to emit a fan beam 318 of laser light towards interface 312 when wheel assembly 300 is rotated to the balance position for the inner clip weight placement. If wheel assembly 300 is not in the balance position, laser light source 316 does not emit fan beam 318 to indicate to the user that wheel assembly 300 is not in a proper position for weight placement. In a "mixed mode" balance procedure laser light source 306 and laser light source 316 are configured to emit respective fan beams 308 and 318 towards wheel rim 302 and interface 312 when wheel assembly 300 is in a respective balance position.

Prior art balancing systems did not use a line of laser light because a line does not define an axial placement distance along the line and for prior art systems, that is a requirement for proper operation. Prior art systems also applied a fixed correction weight tolerance regardless of the weight location determined. With most wheel assemblies this tolerance is too loose for static imbalance and too tight for couple imbalance. This can result in excessive residual static force remaining creating vibration related complaints. Prior art systems also assumed the same importance for both static and couple imbalance forces.

Balancing in accordance with the exemplary embodiment of the present invention evaluates static and couple forces independently, applies separate limits, and then computes correction weights based on vibration force reduction, not fixed weight tolerances. Each limit is based on the amount of force needed to induce noticeable vibration in the wheel assembly. Accordingly, placement of the balance weight axially displaced along the line of laser light may be off slightly from the determined axial placement without introducing significant imbalance to wheel assembly 300.

Figure 4:
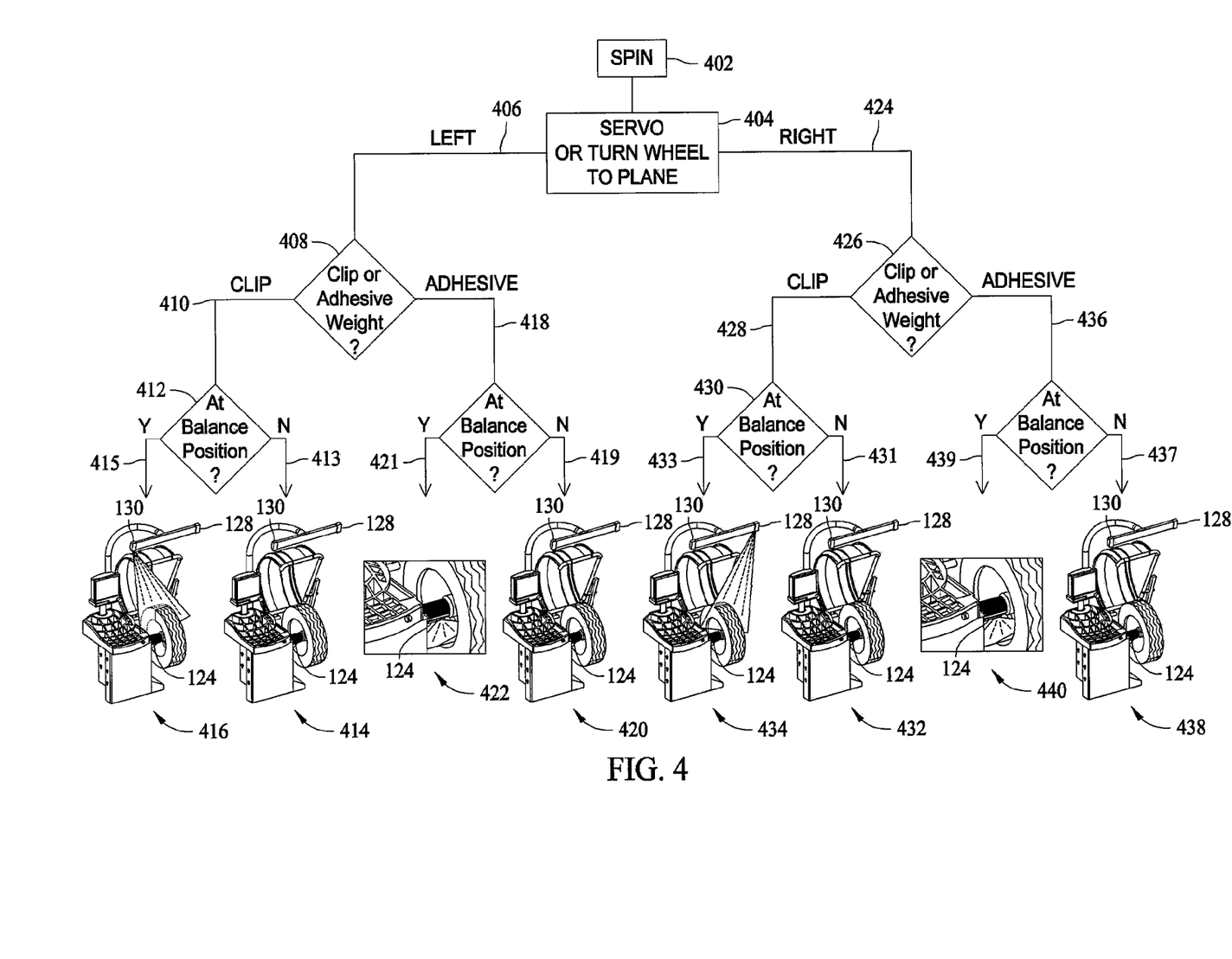
FIG. 4 is a flow diagram of an exemplary method 400 of facilitating weight placement on a vehicle wheel assembly in accordance with an embodiment of the present invention.

FIG. 4 is a flow diagram of an exemplary method 400 of facilitating weight placement on a vehicle wheel assembly in accordance with an embodiment of the present invention. Method 400 includes spinning 402 a wheel assembly to determine an imbalance characteristic associated with a plane of the vehicle wheel assembly and to determine a correction weight placement angular position associated with the determined imbalance characteristic. In the exemplary embodiment, the wheel assembly is rotated 404 to a balance position for the plane to be corrected by a servo assembly. In an alternative embodiment, the wheel assembly is rotated manually by a user. A path 406 is followed if the plane being corrected is the inner plane of the wheel assembly. A type of weight to be installed is determined 408. A path 410 is followed if a clip weight is to be installed. The position of the wheel assembly with respect to the balance position is determined 412. If the wheel assembly is not at the balance position 413, light source 130 is not energized, as illustrated at 414. If the wheel assembly is at the balance position 415, light source 130 directed towards the inner wheel/tire interface is energized, illuminating the tire and/or wheel/tire interface, as is illustrated at 416.

If the determined type of weight to be installed on the inner plane is an adhesive type weight, a path 418 is followed. If the wheel assembly is not at the balance position 419, light source 124 is not energized, as illustrated at 420. If the wheel assembly is at the balance position 421, light source 124, directed towards the inner wheel rim is energized, illuminating the inner wheel rim, as is illustrated at 422.

A path 424 is followed if the plane being corrected is the outer plane of the wheel assembly. A type of weight to be installed is determined 426. A path 428 is followed if a clip weight is to be installed. The position of the wheel assembly with respect to the balance position is determined 430. If the wheel assembly is not at the balance position 431, light source 128 is not energized, as illustrated at 432. If the wheel assembly is at the balance position 433, light source 128 directed towards the outer wheel/tire interface is energized illuminating the tire and/or wheel/tire interface, as is illustrated at 434.

If the determined type of weight to be installed on the outer plane is an adhesive type weight, a path 436 is followed. If the wheel assembly is not at the balance position 437, light source 124 is not energized, as illustrated at 438. If the wheel assembly is at the balance position 439, light source 124, directed towards the inner wheel rim is energized, illuminating the inner wheel rim, as is illustrated at 440.

Figure 5:
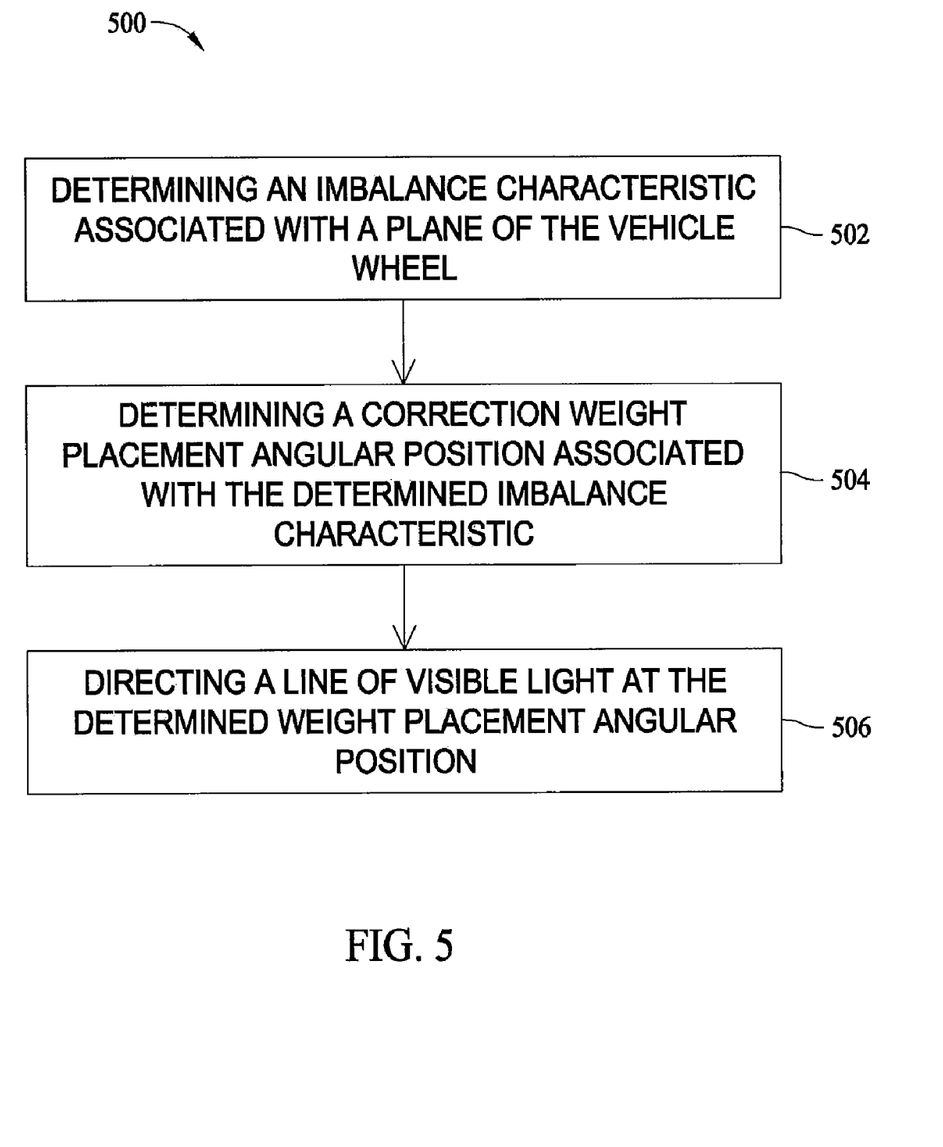
FIG. 5 is a flow chart of an exemplary method of facilitating weight placement on a vehicle wheel assembly wherein the vehicle wheel assembly includes a tire and a wheel.

FIG. 5 is a flow chart of an exemplary method 500 of facilitating weight placement on a vehicle wheel assembly wherein the vehicle wheel assembly includes a tire and a wheel. Method 500 includes determining 502 an imbalance characteristic associated with a plane of the vehicle wheel, determining 504 a correction weight placement angular position associated with the determined imbalance characteristic, and directing 506 a line of visible light at the determined weight placement angular position. In the exemplary embodiment, after the correction weight placement angular position is determined, the wheel assembly is automatically rotated to a balance position wherein the determined weight placement angular position corresponds to a reference position. The reference position is also selectable by the user as a position wherein installing the balance weight is convenient for the user. In some cases the reference position may be a top dead center position, a bottom dead center position, or a position between top dead center and bottom dead center. Wherever the reference position is selected, the wheel balancing system rotates the wheel assembly such that the determined correction weight placement angular position is aligned with the reference position. The wheel balancing system also maintains the wheel assembly in the balance position such that a force applied to the wheel assembly that deflects the wheel assembly from the balance position is countered by the wheel balancing system and the wheel balancing system returns the wheel assembly to the balance position. In the exemplary embodiment, an active servo control is used to maintain the wheel assembly in the balance position, however other devices capable of performing the functions described herein are also contemplated. In an alternative embodiment, wheel assembly is manually rotated to the balance position.

When in the balance position, a light source is energized to direct the line of light towards the current correction weight placement angular position. When the determined imbalance correction indicates an outer plane correction weight is required, the light source aimed towards the outboard flange of the wheel assembly is energized when the wheel assembly is rotated to the balance position. Only energizing the light source that is aimed towards the current weight placement area of the wheel assembly provides to user with an additional visual cue to facilitate a proper weight installation. Similarly when a weight placement on the inboard flange or the inner rim of the wheel is indicated only the light source aimed towards that location will energize when the wheel assembly is rotated to the corresponding balance position.

In the exemplary embodiment, the line of light is directed towards the determined weight placement angular position at the interface between the wheel and the tire where a clip-on type weight is normally attached. In an alternative embodiment, the line of light may be directed towards the tire or the wheel at the determined weight placement angular position. However, the closer the line of light appears to the actual weight placement position (the interface between the wheel and the tire), the more accurate the weight placement will be.

When using adhesive weights applied to the inner rim of the wheel assembly, the line of visible light is directed towards the determined weight placement angular position at the inner surface of the wheel rim. Prior art systems did not use a line of light to indicate the weight placement angular position on the inner rim because there is no indication of a precise axial position to place the weight accurately along the line of light. However, using the line of light methodology of the various embodiments of the present invention as described herein along with SmartWeight™ technology as described in U.S. Pat. No. 6,952,964 to Gerdes et al., precise placement axially along the weight placement angular position is less important.

Method 500 also includes inputting a location of at least one spoke of the wheel assembly using the line of light by aligning the line of light with a first reference point associated with a first spoke, inputting a first signal indicative of the alignment of the line of light with the first reference point, then aligning the line of light with a second reference point associated with at least one of the first spoke and a second spoke and inputting a second signal indicative of the alignment of the line of light with the second reference point. Using the first and second signals, the wheel balancing system determines the location of all the spokes of the wheel assembly.

Method 500 also is used to match a particular tire to a wheel such that imperfections in the tire and/or wheel may be aligned to facilitate reducing overall wheel assembly vibration due to the imperfections. For example, during fabrication some tires exhibit non-balance, radial force-related problems associated with for example, but not limited to tire uniformity, tire and rim runout, wheel-to-balancer mounting error, and improper bead seating of the tire to the rim that are manifested as a radial force variation during operation with weight on the tire. Normally, the weight of the vehicle applies a load on the tire while the vehicle is on the road during operation. However, load can be applied during balancing using a load roller. Determining radial force variations using a load roller is described in U.S. Pat. No. 6,523,408 to Colarelli et al. In various embodiments of the present invention, a line of laser light is used to indicate positions where a tire uniformity parameter and a balance parameter indicate areas on the tire and the wheel that should be marked and then matched to facilitate reducing the non-balance radial force related vibration. Uniformity parameters also include but are not limited to wheel radial and lateral runout and tire radial, lateral, and tangential force variation. By marking each position on the tire and the wheel that provides the greatest improvement in vibration, the tire may be rotated with respect to the wheel until the marks match such that the forces generated by tire non-uniformity and rim runout for example, can be substantially canceled.

The above-described methods and systems for balancing automotive vehicle wheels are cost-effective and highly reliable. The methods include rotating the wheel to determine imbalance condition of the wheel, determining the magnitude and direction of imbalance correction weights required at an inner and outer imbalance correction planes and indicating a precise location for weight placement using at least one line of laser light. The method facilitates inputting the positions of spokes in spoke-type wheels and the method also facilitates reducing non-balance, radial force-related problems by permitting precise marking of the tire and wheel so that the marks can be accurately radially aligned.

While the invention has been described in terms of various specific embodiments, those skilled in the art will recognize that the invention can be practiced with modification within the spirit and scope of the claims.

What is claimed is:

1. A method of facilitating weight placement on a vehicle wheel assembly including a tire and a wheel, said method comprising:
   determining an imbalance characteristic associated with a plane of the vehicle wheel;
   determining a correction weight placement position associated with the determined imbalance characteristic;
   automatically maintaining the wheel assembly in a balance position such that the determined weight placement position corresponds to a predetermined reference position; and
   directing a line of visible light substantially at the determined weight placement position.

2. A method in accordance with claim 1 wherein automatically maintaining the wheel assembly in a balance position such that the determined weight placement position corresponds to a predetermined reference position comprises automatically maintaining the wheel assembly in a balance position using an active servo control to counter any deflection of the wheel assembly from the determined weight placement position.

3. A method in accordance with claim 1 wherein automatically maintaining the wheel assembly in a balance position comprises automatically rotating the wheel to the balance position using an active servo control when the wheel is deflected from the balance position.

4. A method in accordance with claim 1 wherein directing a line of visible light at the determined weight placement angular position comprises directing a line of visible light at the determined weight placement position across at least one of an interface between the tire and the wheel, and a surface of the tire.

5. A method in accordance with claim 1 wherein directing a line of visible light at the determined weight placement position comprises directing a line of visible light at the determined weight placement position at an inner surface of a rim of the wheel.

6. A method of facilitating weight placement on a vehicle wheel assembly having an axis of rotation, said vehicle wheel assembly including a tire and a wheel, said method comprising:
   determining an imbalance characteristic associated with a plane of the vehicle wheel assembly;
   determining a correction weight placement position associated with the determined imbalance characteristic; and
   directing a line of visible light substantially at the determined weight placement position across at least one of the interface between the tire and the wheel, and the tire only when the wheel assembly is substantially in a balance position using a light source associated with the plane of the vehicle wheel assembly wherein said light source is axially displaced from the balance plane and outside a circumferential periphery of the wheel.

7. A method in accordance with claim 6 wherein the wheel assembly includes an inner plane and an outer plane and wherein directing a line of visible light comprises directing the line of visible light corresponding to the plane at the current placement position.

8. A method in accordance with claim 1 wherein directing a line of visible light comprises directing a line of visible light across at least one of an interface between the tire and the wheel, and the tire.

9. A method in accordance with claim 1 wherein directing a line of visible light comprises directing a line of visible light from a source axially displaced from the plane.

10. A method in accordance with claim 6 wherein the determined weight placement position comprises a top dead center position.

11. A method of facilitating weight placement on a vehicle wheel assembly including a tire and a wheel, said method comprising:
    determining an imbalance characteristic associated with a plane of the vehicle wheel;
    determining a correction weight placement position associated with the determined imbalance characteristic;
    directing a line of visible light substantially at the determined weight placement position; and
    inputting a location of at least one spoke of the wheel assembly using the line of light.

12. A method in accordance with claim 11 further comprising:
    aligning the line of light with a first reference point associated with a first spoke;
    inputting a signal indicative of the alignment of the line of light with the first reference point;
    aligning the line of light with a second reference point associated with at least one of the first spoke and a second spoke;
    inputting a signal indicative of the alignment of the line of light with the second reference point; and
    determining spoke location information using the alignments.

13. A method of facilitating weight placement on a vehicle wheel assembly including a tire and a wheel, said method comprising:
    determining an imbalance characteristic associated with a plane of the vehicle wheel;
    determining a correction weight placement position associated with the determined imbalance characteristic;
    directing a line of visible light substantially at the determined weight placement position;
    determining a second imbalance characteristic associated with a plane of the vehicle wheel;
    determining a second correction weight placement position associated with the second imbalance characteristic; and
    directing a second line of visible light substantially at the second weight placement position.

14. A wheel balancer system for measuring imbalance in a vehicle wheel assembly including at least a tire, a wheel, and an inner balancing plane and an outer balancing plane each normal to an axis of rotation of the vehicle wheel assembly, said system comprising:
    a rotatable wheel assembly mount;
    a light source associated with the inner balancing plane and a light source associated with the outer balancing plane, said light sources axially displaced from the associated balancing plane and outside a circumferential periphery of the wheel; and a processor communicatively coupled to at least one imbalance sensor configured to measure an imbalance characteristic associated with the wheel assembly; said processor configured to:

determine imbalance characteristics of the wheel assembly;

determine a correction weight placement position associated with the determined imbalance characteristics; and direct a line of visible light across at least one of an interface between the tire and the wheel and the tire corresponding to the plane associated with the current placement position at the determined weight placement position only when the wheel assembly is positioned substantially at a balance position.

15. A system in accordance with claim 14 wherein said processor is further configured to transmit a command to a wheel assembly positioning subsystem to automatically position the wheel assembly in a balance position such that the determined weight placement angular position corresponds to a predetermined reference position.

16. A wheel balancer system for measuring imbalance in a vehicle wheel assembly, including at least a tire and a wheel, said system comprising:

a rotatable wheel assembly mount;

a subsystem coupled to said wheel assembly mount, said subsystem configured to rotate said wheel assembly to a balance position wherein a correction weight placement is indicated at a weight placement position; and a light source configured to direct a line of visible light toward at least one of an interface between the tire and the wheel, and an inner circumferential periphery of a rim of the wheel at the weight placement position only when the wheel assembly is positioned substantially at the balance position associated with the weight placement position.

17. A system in accordance with claim 16 wherein said subsystem is configured to use an active servo control to at least one of maintain said wheel assembly in the balance position and automatically rotate the wheel assembly to the balance position when the wheel is deflected from the balance position such that a determined weight placement position corresponds to a predetermined reference position.

18. A system in accordance with claim 16 wherein said light source comprises a light source associated with an outer balance plane of the wheel assembly, said light source is axially displaced from the outer balance plane and outside a circumferential periphery of the wheel.

19. A system in accordance with claim 16 further comprising a second light source configured to direct a line of visible light toward at least one of an interface between the tire and the wheel, and an inner circumferential periphery of a rim of the wheel at a weight placement position when the wheel assembly is positioned substantially at a balance position.

* * * * *